United States Patent [19]

Smith

[11] Patent Number: 4,525,560

[45] Date of Patent: Jun. 25, 1985

[54] SOLUTION POLYMERIZATION OF CONJUGATED DIENES

[76] Inventor: Richard L. Smith, Bartlesville, Okla. 74004

[75] Inventors: Richard L. Smith, Bartlesville, Okla.

[73] Assignee: Phillips Petroleum Company, Bartlesville, Okla.

[21] Appl. No.: 478,750

[22] Filed: Mar. 25, 1983

Related U.S. Application Data

[63] Continuation of Ser. No. 152,066, May 20, 1980, abandoned, which is a continuation of Ser. No. 40,020, May 18, 1979, abandoned.

[51] Int. Cl.$^3$ .............................................. C08F 36/06
[52] U.S. Cl. .................................... 526/201; 526/335; 526/340
[58] Field of Search ............... 526/201, 202, 203, 208, 526/340.4, 340, 335

[56] References Cited

U.S. PATENT DOCUMENTS

| | | | |
|---|---|---|---|
| 3,644,585 | 2/1972 | Takayanagi | 526/340.4 |
| 4,098,980 | 7/1978 | Markle | 526/340.4 |
| 4,219,627 | 8/1980 | Halasa | 526/346 |

*Primary Examiner*—Paul R. Michl

[57] ABSTRACT

A method of producing a conjugated diene polymer comprising polymerizing monomers comprising at least one conjugated diene hydrocarbon under solution polymerization conditions such that substantially all of said monomers are polymerized, terminating the thus formed polymer to deactivate substantially all of the active polymer lithium, and then polymerizing additional portions of said monomers in solution with at least a portion of the terminated polymer under conditions such that substantially all of said additional monomers are polymerized.

31 Claims, No Drawings

SOLUTION POLYMERIZATION OF CONJUGATED DIENES

This is a continuation of copending application Ser. No. 152,066, filed May 20, 1980, abandoned, which in turn was a continuation of application Ser. No. 40,020, filed May 18, 1979, abandoned June 30, 1980.

This invention relates to the lithium initiated solution polymerization of monomers comprising at least one conjugated diene hydrocarbon and optionally at least one monovinylarene hydrocarbon to produce conjugated diene polymers. The term conjugated diene polymers is used herein in its broadest sense to include homopolymers and copolymers of conjugated dienes and copolymers of at least one conjugated diene and at least one monovinylarene hydrocarbon.

The use of lithium initiated solution polymerization to prepare conjugated diene polymers is well known in the art. The solution polymerization technique is a particularly favored technique because generally it allows those skilled in the art to have more control over the polymerization and the properties of the end products than with other polymerization techniques.

One of the significant factors in the economics of solution polymerization is the recovery of the solvent from the polymer. If one could produce larger amounts of polymer in a given amount of solvent it would reduce the expenses of solvent recovery and also the amount of solvent that is required in inventory for the production of specific amounts of polymer.

In theory it would appear that one could produce larger amounts of polymer in a given amount of solvent by merely increasing the proportions of the ingredients in the polymerization recipe and obtaining a polymerization reaction mixture having a higher weight percent of polymer solids. In actual practice, however, such a procedure has not proven satisfactory. The use of larger amounts of monomers to produce polymerization reaction mixtures containing more than about 15 weight percent polymer solids generally has resulted in correspondingly higher peak reaction temperatures. The higher peak reaction temperatures in turn have resulted in an increased reactor fouling and a decreased polymer quality. The polymers produced in such procedures generally have tended to be somewhat discolored and have not handled as well on processing equipment as polymers produced at lower temperatures. The use of cooling to keep a more desirable peak temperature, of course, adds additional expense which counters the economic advantage of reduced solvent recovery expense.

An object of the present invention is to provide a process for increasing the weight percent of solid polymer produced in an alkali metal initiated solution polymerization.

In another aspect an object of the present invention is to provide a process for increasing the weight percent of solid polymer produced in lithium initiated solution polymerization where the polymer quality can be maintained without the employment of additional cooling of the polymerization reactor.

In still another aspect this invention relates to a method for reducing the solvent requirements for lithium initiated solution polymerization.

In still another aspect this invention relates to a method for reducing the expense of solvent recovery in alkali metal initiated solution polymerization.

In accordance with the instant invention there is provided a method of producing a conjugated diene polymer comprising (a) contacting monomers comprising at least one polymerizable conjugated diene hydrocarbon and optionally at least one copolymerizable monovinylarene hydrocarbon with an organolithium initiator under solution polymerization conditions until substantially all of said monomers have been polymerized, (b) then contacting the living polymer so formed with at least enough terminating agent to deactivate substantially all of the active polymer lithium, (c) then contacting additional portions of said monomers with an organolithium initiator in solution with at least a portion of the terminated polymer of step (b) under solution polymerization conditions until substantially all of said additional portions of said monomers have been polymerized.

Typically the polymerization steps of this invention are carried out to give at least about 99.5% conversion of the monomers to polymer.

The optimum amount of conjugated diene polymer that is employed as a diluent will depend mainly on the amount of solids that can be handled by the polymer recovery equipment and on the extent of heat sink effect that the polymer diluent has on the polymerization reaction.

Recipes and polymerization conditions suitable for producing polymers of particular properties can be determined by routine experimentation using the same considerations as are used in solution polymerizations employing more conventional diluents. Preferably, the amount of reactants and polymer diluent employed are such that substantially complete conversion can be obtained at temperatures below those which adversely affect the properties of the polymer. It is generally preferred that the polymerization reaction be carried out under conditions such that the peak temperature is no greater than about 125° C. Generally, under essentially adiabatic polymerization conditions, it has been found preferable for the charge of monomers to be no greater than about 15 percent of the total weight of monomer and diluent, the term diluent including both conventional hydrocarbon diluent and terminated polymer diluent, where employed.

REACTOR SYSTEM

The process of this invention is suitable for use in continuous or batch polymerizations. If a continuous process is employed, any polymerization reactor means or configuration is suitable as long as there is provided a means of returning (recycling) at least a portion of the terminated polymer cement that is continuously being produced back to the polymerization zone. Non-limiting examples of suitable continuous polymerization reactor means include such as one or more stirred reactors connected in series, or one or more stirred reactors connected in series connected further in series with one or more tube reactors connected in series. The live polymer cement can be terminated by addition of terminating agent at any point in the reactor system wherein conversion of monomer to polymer is essentially quantitative. Alternatively an additional reactor means can be included in the polymerization reactor system for conducting the terminating reaction, said reactor means being a stirred reactor or a tube reactor, the latter preferably including a mixing means such as a Kenics Static mixer. A pre-polymerization reactor can be incorporated for the purpose of purifying (scavenging of fast polymerization poisons) part or all of the feed streams entering the initial polymerization zone. A vessel means for flashing solvent from the terminated polymer cement can be located downstream from the polymerization zone, with provision for recycling at least part of the concentrated, cooled, terminated polymer cement from said flash vessel means back to the polymerization zone.

For batch polymerization, any polymerization reactor means or configuration taught in the art for use in batch polymerization is suitable. The process of this invention can be conducted in a single reactor means, preferably a stirred reactor means to insure good mixing of the polymerization ingredients. Following formation of polymer, such as for example, homopolymer, random copolymer, or block copolymer, and termination of the live polymer cement, additional polymerization ingredients can be charged and polymerization conducted using the terminated polymer cement from the preceding polymerization as at least a portion of the polymerization diluent. Successive polymerizations can be conducted in this manner until the capacity of the reactor is reached or until cement viscosity becomes the limiting factor. If desired, a portion of the terminated polymer cement can be removed from the polymerization zone and subjected to polymer recovery prior to charging the next batch of polymerization ingredients.

In this batch process, polymerization diluent can be flashed from the polymerization zone prior to charging the next batch of polymerization ingredients, this flashing step serving as a means of cooling the polymerization reactor and the polymer cement prior to initiation of the next batch of monomer. Termination of the polymer cement can be effected prior to or following the flashing step but before charging of the next batch of polymerization ingredients. Alternatively, the terminated polymer cement can be transported from the polymerization reactor means to a separate flash zone and all or part of the concentrated, cooled, terminated, polymer cement recycled back to the polymerization reactor zone. A pre-polymerization feed stream scavenging reactor means, as described previously for the continuous polymerization process, can be used in the batch polymerization process if desired.

MONOMERS

The polymerization process in accordance with this invention is one of the homopolymerization of one polymerizable conjugated diene, copolymerization of at least two polymerizable conjugated dienes, or copolymerization of at least one polymerizable conjugated diene and at least one copolymerizable monovinylarene, with the term "polymerizable" referring to solution polymerizable monomers polymerizable with an organolithium initiator.

The polymerizable conjugated dienes generally contain 4 to 12 carbon atoms per molecule for convenience and availability, those containing 4 to 8 carbon atoms being preferred for commercial purposes, and presently most preferred for similar reasons are butadiene and isoprene. Examples include 1,3-butadiene and isoprene, as well as 2,3-dimethyl-1,3-butadiene, piperylene, 3-butyl-1,3-octadiene, 2-phenyl-1,3-butadiene, and the like, alone or in admixture. As suitable conjugated diene feedstocks, we can also employ mixtures of 1,3-butadiene, or other suitable conjugated dienes, in admixture with other low molecular weight hydrocarbons. Such admixtures, termed low concentration diene streams, are obtainable from a variety of refinery product streams such as naphtha-cracking operations or can be intentionally blended compositions, available from product streams produced in the modern complex oil refining and petrochemical facilities. Low concentration diene streams may contain such as from less than 30 to more than 50 weight percent of 1,3-butadiene, though the concentration can range widely. Examples of typical low molecular weight hydrocarbons which may be admixed with 1,3-butadiene in the polymerization feed include such as propane, propylene, iso- and n-butane, 1-butene, isobutylene, trans-2-butene, cis-2-butene, vinylacetylene, cyclohexane, and the like.

Monovinylarene monomers employed in the context of our invention are those known to polymerize with organolithium initiators in solution polymerization systems. These monovinylarenes typically contain 8 to 20 carbon atoms per molecule, more usually 8 to 14 for commercial purposes, and most preferred is styrene at the most readily commercially available monomer. Exemplary species include the presently preferred styrene, as well as 1-vinylnaphthalene, 2-vinylnaphthalene, and various alkyl, cycloalkyl, aryl, alkaryl and aralkyl derivatives thereof, such as 3-methylstyrene, 4-propylstyrene, 4-cyclohexylstyrene, 4-dodecylstyrene, 2-ethyl-4-benzylstyrene, 4-p-tolylstyrene, 4-(4-phenylbutyl)styrene, and the like, alone or in admixture.

The relative amount of conjugated diene or dienes and monovinylarene or arenes employed for the preparation of copolymers can vary over a wide range. In preparing rubbery copolymers, the proportion of the conjugated diene versus the monovinylarene should be sufficient so as to result in a substantially rubbery or elastomeric copolymer product. There is no sharp break point as to the amount of conjugated diene versus monovinylarene that confers rubbery or elastomeric properties on the resulting copolymer, though in general at least 50 parts by weight of conjugated diene are required on an exemplary basis. Thus, for a rubbery copolymer, as is preferred in accordance with our invention, the weight ratio of conjugated diene to monovinylarene would be in the range of about 50:50 to 95:5. Of course, mixtures of conjugated dienes as well as mixtures of monovinylarenes can be utilized.

ORGANOLITHIUM INITIATORS

Organolithium initiators employed in the process of this invention include the monofunctional and multifunctional types known for solution polymerization of the monomers as described hereinabove. The multifunctional organolithium initiators can be either specific organolithium compounds, or can be multifunctional types which are not necessarily specific compounds but rather represent reproducible compositions of regulable functionality.

The choice of initiator can be governed by the degree of branching and the degree of elasticity desired for the polymer, the nature of the feedstock, and the like. With regard to the feedstock employed as the source of conjugated diene, for example, the multifunctional initiator types generally are preferred when a low concentration diene stream is at least a portion of the feedstock, since some components present in the unpurified low concentration diene stream may tend to react with carbon-lithium bonds to deactivate initiator activity, thus necessitating the presence of sufficient lithium functionality in the initiator so as to override such effects.

Among the multifunctional initiators, again which are not necessarily specific compounds, are those prepared by reacting an organomonolithium compound with a multivinylphosphine or with a multivinylsilane, such reaction preferably being conducted in an inert diluent such as a hydrocarbon or a mixture of a hydrocarbon and a polar organic compound. The reaction between the multivinylsilane or multivinylphosphine and the organomonolithium compound can result in a precipitate, which can be solubilized if desired, by adding a solubilizing monomer such as a conjugated diene or monovinylarene, after reaction of the primary components. Alternatively, the reaction can be conducted in the presence of a minor amount of the solubilizing monomer. Relative amounts of organomonolithium compound and multivinylsilane or multivinylphosphine preferably should be in the range of about 0.33 to 4 moles of organomonolithium compound per mole of vinyl group present in the multivinylsilane or multivinylphosphine employed.

Exemplary organomonolithium compounds include ethyllithium, isopropyllithium, n-butyllithium, sec-butyllithium, tert-octyllithium, n-eicosyllithium, phenyllithium, 2-naphthyllithium, 4-butylphenyllithium, 4-tolyllithium, 4-phenylbutyllithium, cyclohexyllithium, and the like.

Exemplary multivinylsilane compounds include tetravinylsilane, methyltrivinylsilane, diethyldivinylsilane, di-n-dodecyldivinylsilane, cyclohexyltri-vinylsilane, phenyltrivinylsilane, benzyltrivinylsilane, (3-ethylcyclohexyl) (3-n-butylphenyl)divinylsilane, and the like.

Exemplary multivinylphosphine compounds include trivinylphosphine, methyldivinylphosphine, dodecyldivinylphosphine, phenyldivinylphosphine, cyclooctyldivinylphosphine, and the like.

Other multifunctional polymerization initiators can be prepared by utilizing an organomonolithium compound, further together with a multivinylarene. Furthermore, an organolithium compound can be reacted with a multivinylarene and either a conjugated diene or monovinylarene or both. These ingredients can be charged initially, usually in the presence of a hydrocarbon or a mixture of a hydrocarbon and a polar organic compound as diluent. Alternatively, a multifunctional polymerization initiator can be prepared in a twostep process by reacting an organomonolithium compound with a conjugated diene or monovinylarene and then adding the multivinylarene. Any of the conjugated dienes or monovinylarenes described can be employed. The ratio of conjugated diene or monovinylarene employed preferably should be in the range of about 2 to 15 moles of polymerizable compound per mole of organolithium compound. The amount of multivinylarene employed preferably should be in the range of about 0.05 to 2 moles per mole of organomonolithium compound.

Exemplary multivinylarenes include 1,2-divinylbenzene, 1,3-divinylbenzene, 1,4-divinylbenzene, 1,2,4-trivinylbenzene, 1,3-divinylnaphthalene, 1,8-divinylnaphthalene, 1,3,5-trivinylnaphthalene, 2,4-divinylbiphenyl, 3,5,4'-trivinylbiphenyl, 1,3-divinyl-4,5,8-tributylnaphthalene, and the like. Divinyl aromatic hydrocarbons containing up to 18 carbon atoms per molecule are preferred, particularly divinylbenzene as either the ortho, meta, or para isomer, and commercial divinylbenzene, which is a mixture of the three isomers, and other compounds such as the ethylstyrenes, also is quite satisfactory.

Additional information regarding such multifunctional polymerization initiators can be found in U.S. Pat. No. 3,668,263, Morrison et al (1972) and U.S. Pat. No. 3,776,964, Morrison et al (1973).

Other types of multifunctional initiators can be employed, such as those prepared by contacting a sec- or tert-organomonolithium compound with 1,3-butadiene, in a ratio of such as about 2 to 4 moles of organomonolithium compound per mole of 1,3-butadiene, in the absence of added polar material in this instance, with the contacting preferably being conducted in an inert hydrocarbon diluent, though contacting without the diluent can be employed, if desired.

Alternatively, specific organolithium compounds can be employed as initiators, if desired, in the preparation of the polymers in accordance with our invention. These can be represented by $R(Li)_x$ wherein R represents a hydrocarbyl radical of such as 1 to 20 carbon atoms per group, and x is an integer of 1 to 4. Exemplary organolithium compounds are methyllithium, isopropyllithium, n-butyllithium, sec-butyllithium, tert-octyllithium, n-decyllithium, phenyllithium, 1-naphthyllithium, 4-butyl-phenyllithium, p-tolyllithium, 4-phenylbutyllithium, cyclohexyllithium, 4-butylcyclohexyllithium, 4-cyclohexylbutyllithium, dilithiomethane, 1,4-dilithiobutane, 1,10-dilithio-decane, 1,20-dilithioeicosane, 1,4-dilithiocyclohexane, 1,4-dilithio-2-butene, 1,8-dilithio-3-decene, 1,2-dilithio-1,8-diphenyloctane, 1,4-dilithiobenzene, 1,4-dilithionaphthalene, 9,10-dilithioanthracene, 1,2-dilithio-1,2diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, 4,4'-dilithiobiphenyl, and the like.

The amount of organolithium initiator to be used depends upon the desired molecular weight of the polymer but is normally in the range of about 0.1 to 100 milliequivalents of active lithium per 100 grams of total monomer, more preferably from 0.2 to 5 milliequivalents of active alkali metal per 100 grams monomer. The term "active lithium" as used herein is intended to denote that lithium which is capable of initiating polymerization of the monomers.

RANDOMIZING AGENTS

The organolithium initiated polymerization process of this invention can employ a mixture of monomers with the polymerization preferably conducted in a hydrocarbon diluent, further with a randomizing agent to substantially avoid formation of substantial block content. The randomizing agent is included in the polymerization reaction mixture. Any suitable polar organic compound known in the art for randomization can be employed for such purposes, including the hydrocarbyl ethers, thioethers, and amines. Such polar compounds, particularly the ethers such as tetrahydrofuran, tend to lead to polymers of substantial vinyl unsaturation content with respect to the portion derived from the conjugated diene monomer.

Where randomization without vinylization or with minimum vinylization is desired, then compounds of other types can be readily employed to produce low vinyl copolymers. Examples of such other types of compounds include the alkylpotassium compounds such as methylpotassium, ethylpotassium, n-propylpotassium, isopropylpotassium, tert-butylpotassium, tert-amylpotassium, n-hexylpotassium, cyclohexylpotssium, and the like.

Other suitable randomizing agents include the potassium salts of mono- and polyhydric alcohols, mono- and polyhydric phenols, including bisphenols, and sulfur analogs of same. Specific examples of such compounds include the potassium salts of methyl alcohol, ethyl alcohol, n-propyl alcohol, isopropyl alcohol, tert-butyl alcohol, tert-amyl alcohol, n-hexyl alcohol, cyclohexyl alcohol, benzyl alcohol, phenol, catechol, resorcinol, hydroquinone, pyrogallol, 1-naphthol, 2-naphthol, 2,6-di-tert-butyl-4-methylphenol, ethanethiol, 1-butanethiol, 2-pentanethiol, 2-methyl-2-propanethiol, thiophenol, 1,12-dodecanedithiol, 2-naphthalenethiol, cyclohexanethiol, 1,8-octanedithiol, 1,4-benzenedithiol, and the like. Also the potassium salts of 2,2'-methylene-bis(4-methyl-6-tert-butylphenol), 2,2'-isopropylidene-bis(6-cyclohexyl-p-cresol), and the like.

Potassium salts of mono- and polycarboxy acids and sulfur analogs can be employed such as the potassium salts of isovaleric acid, caprylic acid, lauric acid, stearic acid, oleic acid, linolenic acid, cyclopentanecarboxylic acid, phenylacetic acid, benzoic acid, azelaic acid, phthalic acid, 1,8,16-hexadecanetricarboxylic acid, 2-naphthoic acid, hexanedithioic acid, thiobenzoic acid, and the like.

Examples of suitable potassium carbonates and sulfur analogs include the potassium salts of tert-butylcarbonic acid, n-hexylcarbonic acid, 3,5-dimethylhexylcarbonic acid, n-dodecylcarbonic acid, and the like.

Examples of potassium salts of secondary amines suitable for use as randomizers include the potassium salts of dimethylamine, di-n-butylamine, methyl-n-hexylamine, di(3,5-diethyloctyl)amine, diphenylamine, dibenzylamine, and the like.

Other effective low vinyl randomizing agents are the hexaalkylphosphoramides employed alone, or employed in conjunction with the above potassium compounds, particularly and preferably with the potassium alkoxides. Examples of compounds of this type include the presently preferred hexamethylphosphoramide, as well as hexaethylphosphoramide, hexa-n-propylphosphoramide, trimethyltrihexylphosphoramide, and the like.

In all references to potassium randomizers above, the equivalent sodium, cesium, or rubidium compound can be employed, though potassium compounds and particularly the potassium alkoxides are preferred for effectiveness and availability. The term "alkali metal randomizer" as used herein thus refers to suitable compounds of sodium, potassium, cesium, or rubidium.

DILUENTS

Polymerization preferably is carried out in the presence of a hydrocarbon diluent which can be one or more aromatic, paraffinic, or cycloparaffinic compounds, preferably such as one or more of those containing 4 to 10 carbon atoms per molecule, and which is a liquid under the conditions of the process. Examples include butane, pentane, isooctane, cyclopentane, cyclohexane, benzene, toluene, xylene, ethylbenzene, hexane, and the like, alone or in admixture.

However, it is within the scope of this invention to use terminated liquid polymer as polymerization diluent in batch polymerizations. The term "liquid polymer" here indicates that the polymer is liquid under the conditions of the reaction. Typically, in such a process a hydrocarbon diluent is used for the first polymerization batch of low molecular weight polymer and the diluent is then completely removed by flashing leaving liquid polymer for polymerization diluent for succeeding polymerization batches.

GEL INHIBITORS

A problem of major concern associated with continuous processes for polymerizing conjugated dienes in the presence of an organolithium catalyst involves the formation of gel during polymerization. While the presence of gel is undesirable from the standpoint of having a deleterious effect on the polymer produced, a second and equally undesirable aspect is reactor fouling, that is to say the reactor becomes impacted with gel and polymer. This condition necessitates interrupting of the polymerization and cleaning the reactor, in more severe cases necessitating disassembly of the reactor and associated conduits to remove the gel before polymerization can be resumed.

Whereas the continuous process for practicing the instant invention typically is conducted in a manner to minimize gel formation, such as by providing for a minimum residence time required to achieve quantitative conversion of monomer to polymer and by conducting the polymerization in such a manner so as to obtain high conversion, preferably about 95%, in the first reactor means, it is still desirable to add a gel inhibitor to further reduce gel formation.

Suitable gel inhibitors include such as alkyl halides, silicon halides, monoolefins, and 1,2-diolefins. The level of gel inhibitor which is added varies widely, depending on the effectiveness of the specific compound chosen. 1,2-Butadiene is the presently preferred gel inhibitor for the instant invention process, being added within the broad range of 0.01 to 0.3 phm, more preferably from 0.02 to 0.1 phm. (The term phm denotes the parts by weight per 100 parts by weight of the total monomers).

TERMINATING AGENTS

Termination of living polymer can be accomplished by the reaction of the living polymer with substances which are capable of displacing the lithium from the polymer chain, or converting the polymer lithium to a form in which the lithium can no longer initiate polymerization. In the latter case, the lithium is ultimately removed and displaced with a hydrogen atom during polymer recovery. Although termination may be accompanied by the coupling of two or more polymer chains together, this is not a requirement for termination.

In accordance with this invention, the terminator is employed in an amount that is at least sufficient to deactivate substantially all the active polymer lithium. If excess terminator is employed corresponding adjustments are often required in the amount of initiator used in subsequent polymerizations conducted in the presence of portions of the terminated polymer cement.

Termination may be accomplished by allowing the polymer lithium to react with a compound having an active hydrogen atom, such as an alcohol, a phenol, an acid, or water, or by the reaction with a compound having a single active halogen atom, such as a hydrocarbyl monohalide.

Another suitable method of terminating the living polymer is by a specific metal-hydrogen interchange reaction known as transmetalation. Transmetalation reactions are well known in the polymerization art, and involve the interchange of a metal atom on the polymer chain and an exchangeable hydrogen atom on a hydrocarbyl compound. Since transmetalation reactions between organolithium compounds and hydrocarbyl compounds containing an exchangeable hydrogen atom are slow, it is normally necessary to have present a transmetalation activating agent. This activation agent may be an organoalkali metal compound other than organolithium, or such as a chelating amine. A particularly suitable combination of an activating agent and a hydrocarbyl compound suitable for effectively terminating polymer lithium by transmetalation is a mixture of potassium tert-amyloxide and toluene. For the transmetalation reaction using potassium tert-amyloxide and toluene, the K:Li molar ratio can range broadly from 1:1 to 1:10. The K:toluene molar ratio should be at least 1:1, and will normally have a considerably higher ratio of toluene present. The resulting benzylpotassium which is produced in this transmetalation system effectively initiates the polymerization of monomers which are present within the reaction mixture or which are added subsequently.

Termination can also be accomplished by allowing the living polymer to react with a coupling agent. In our use of the term "coupling" as herein employed, the term is a broad generic term meaning the bringing together and joining by means of central coupling atoms or coupling moiety, two or more of the living lithium-terminated polymer chains. If coupling agents are employed which do not result in termination, the coupling step can be followed by a termination step as described hereinbefore.

A wide variety of compounds suitable for coupling can be employed. Among the suitable coupling agents are the multivinylaromatic compounds, multiepoxides, multiisocyanates, multiimines, multialdehydes, multiketones, multihalides, multianhydrides, multiesters which are the esters of polyalcohols with monocarboxylic acids, and the diesters which are esters of monohydric alcohols with dicarboxylic acids, and the like.

Examples of suitable multivinylaromatic compounds include divinylbenzene, 1,2,4-trivinylbenzene, 1,3-divinylnaphthalene, 1,8-divinylnaphthalene, 1,3,5-trivinylnaphthalene, 2,4-divinylbiphenyl, and the like. The divinylaromatic hydrocarbons are preferred, particularly divinylbenzene in either its ortho, meta, or para isomer. Commercial divinylbenzene which is a mixture of the three isomers and other compounds is quite satisfactory.

While any multiepoxide can be used, those which are liquid are preferred since they are more readily handled and form a relatively small nucleus for the radial polymer. Especially preferred among the multiepoxides are the epoxidized hydrocarbon polymers such as epoxidized liquid polybutadiene and the epoxidized vegetable oils such as epoxidized soybean oil and epoxidized linseed oil. Other epoxy compounds such as 1,2; 5,6; 9,10-triepoxydecane, and the like, also can be used.

Examples of suitable multiisocyanates include benzene-1,2,4-triisocyanate, naphthalene-1,2,5,7-tetraisocyanate, and the like. Especially suitable is a commercially available product known as PAPI-1, a polyarylpolyisocyanate having an average of 3 isocyanate groups per molecule and an average molecular weight of about 380. Such a compound can be visualized as a series of isocyanate-substituted benzene rings joined through methylene linkages.

The multiimines, which are also known as multiaziridinyl compounds, preferably are those containing 3 or more aziridine rings per molecule. Examples of such compounds include the triaziridinyl phosphine oxides or sulfides such as tri(1-azaridinyl)phosphine oxide, tri(2-methyl-1-aziridinyl)phosphine oxide, tri(2-ethyl-3-decyl-1-aziridinyl)phosphine sulfide, and the like.

The multialdehydes are represented by compounds such as 1,4,7-naphthalenetricarboxaldehyde, 1,7,9-anthracenetricarboxaldehyde, 1,1,5-pentanetricarboxaldehyde, and similar multialdehyde-containing aliphatic and aromatic compounds.

The multiketones can be represented by compounds such as 1,4,9,10-anthracenetetrone, 2,3-diacetonylcyclohexanone, and the like.

Examples of the multianhydrides include pyromellitic dianhydride, styrene-maleic anhydride copolymers, and the like.

Examples of the multiesters include diethyl adipate, triethyl citrate, 1,3,5-tricarbethoxybenzene, and the like.

Among the multihalides presently preferred are the silicon tetrahalides such as silicon tetrachloride, silicon tetrabromide, and silicon tetraiodide, and the trihalosilanes such as trifluorosilane, trichlorosilane, trichloroethylsilane, tribromobenzylsilane, and the like. Also preferred are the multihalogen-substituted hydrocarbons, such as 1,3,5-tri(bromomethyl)benzene, 2,5,6,9-tetrachloro-3,7-decadiene, and the like, in which the halogen is attached to a carbon atom which is alpha to an activating group such as an ether linkage, a carbonyl group, or a carbon-to-carbon double bond. Substituents inert with respect to lithium atoms in the terminally reactive polymer can also be present in the active halogen-containing compounds. Alternatively, other suitable reactive groups different from the halogen as described above can be present.

Examples of compounds containing more than one type of functional group include 1,3-dichloro-2-propanone, 2,2-dibromo-3-decanone, 3,5,5-trifluoro-4-octanone, 2,4-dibromo-3-pentanone, 1,2; 4,5-diepoxy-3-pentanone, 1,2; 4,5-diepoxy-3-hexanone, 1,2; 11,12-diepoxy-3-pentadecanone, 1,3; 18,19-diepoxy-7,14-eicosanedione, and the like.

In addition to the silicon multihalides as described hereinabove, other metal multihalides, particularly those of tin, lead, or germanium, also can be readily employed as coupling and branching agents. The silicon and other metal multialkoxides, such as silicon tetraethoxide, are also suitable coupling agents for this invention.

Difunctional counterparts of these agents also can be employed, whereby a linear polymer rather than a branched polymer results.

Broadly, and exemplarily, a range of about 0.01 to 4.5 milliequivalents of coupling agent are generally employed per 100 grams of monomer, presently preferred about 0.01 to 1.5 to obtain the desired Mooney viscosity. The larger quantities tend to result in production of polymers containing terminally reactive groups or insufficient coupling. One equivalent of coupling agent per equivalent of lithium is considered optimum amount for maximum branching, if this result is desired in the production line. The coupling agent can be added in hydrocarbon solution, e.g., in cyclohexane, to the polymerization admixture with suitable mixing for distribution and reaction.

POLYMERIZATION CONDITIONS

Polymerization temperatures can vary over a broad range, for example from about −20° C. to about 150°

C., although a preferred temperature range is about 30° C. to about 125° C. Pressure used is sufficient to maintain substantially liquid phase conditions in the reaction zone. This invention is particularly advantageous for those processes in which the polymerization is to be conducted under adiabatic conditions.

When employing a randomizing additive, such as hexaalkylphosphoramide, hydrocarbyl ether, thioether, or amine, a ratio of moles of randomizer to gram atoms of lithium in the initiator in the range of about 200:1 to 0.01:1, preferably about 100:1 to 1:1, is considered exemplary and suitable.

When employing a potassium-containing randomizer, a broad range can be employed such as about 0.25:1 to 100:1 atom ratio Li:K, more preferred about 1:1 to 50:1, again remembering that the "K" also can be any alkali metal other than lithium. It should be kept in mind that a silicon tetrahalide, or other silicon halide employed for purposes of gel suppression, effectively destroys an alkali metal randomizer in the process of addition, and therefore it is necessary to add an amount of such alkali metal randomizer equal to the number of milliequivalents of the silicon (tetra)halide added for gel suppression, plus the effective amount of randomizer needed to provide effective randomization of the conjugated diene with a monovinylarene desired.

As is commonly practiced in polymerization processes, it is preferable to add an antioxidant to the effluent prior to polymer recovery to retard potentially deleterious effects of contact with oxygen. A typical antioxidant is 2,6-di-t-butyl-4-methylphenol, and an exemplary amount is in the range of about 0.5 to 1 part by weight per hundred parts monomers.

After termination the reaction mixture is generally treated to destroy residual organolithium groups which may be present and then the polymer is recovered. Thus, the polymer can be precipitated and the remaining organolithium moieties, if any, inactivated by the addition of such as a lower alcohol, such as isopropyl alcohol, or by steam stripping, followed by separation of the product polymer from any polymerization diluent or other liquid and residue by means such as decantation, filtration, and centrifugation, together with removal of residual volatiles at reduced pressure and moderate temperature such as about 60° C.

The polymers can be compounded with a variety of ingredients including fillers, dyes, pigments, curing or crosslinking agents, softeners, reinforcing agents, and the like, in various compounding operations.

The rubbery polymers produced in accordance with the invention have utility in applications where synthetic and natural rubbers are employed, and can be manufactured or formed into a variety of finished articles, by molding, extruding, or the like. The rubbery random copolymers made in accordance with our invention have particular application as tire tread and sidewall stock.

The following examples will further illustrate the present invention.

EXAMPLE I

This example illustrates a method for producing a butadienestyrene linear random/block copolymer by organolithium initiated solution polymerization using a consecutive two batch process in which following essentially quantitative conversion of a first charge of monomers to polymer and termination of the resulting living polymer, a second charge of monomers is polymerized using a second initiator charge, and the terminated polymer cement from the first polymerization batch is used as the polymerization diluent for the second polymerization batch.

The polymerization was conducted according to Recipe 1 in a jacketed, stirred, stainless steel reactor vessel having a 75.7 liter (20 gallon) capacity and 5.44 kilograms (12 pounds) of total monomer charge in each of the two consecutive batch polymerizations.

| RECIPE 1 | |
|---|---|
| Batch 1 | |
| Step I | |
| Cyclohexane, parts by weight | 600 |
| 1,3-Butadiene, parts by weight | 75 |
| Styrene, parts by weight | 25 |
| Tetrahydrofuran, parts by weight | 0.05 |
| n-Butyllithium, mhm[a] | 1.9 |
| Polymerization temperature, °C. | 55 → 96[b] |
| Polymerization time, minutes | 75 |
| Step II | |
| Methanol, mhm[a][c] | 3.8 |
| Reaction temperature, °C. | 96 → 92 |
| Reaction time, minutes | 5 |
| Step III | |
| Vent reactor to 138-172 kPa (20-25 psi) and cool[d] | |
| Temperature, °C. | 92 → 56 |
| Time, minutes | 75 |
| Batch 2 | |
| Step IV | |
| 1,3-Butadiene, parts by weight | 75 |
| Styrene, parts by weight | 25 |
| n-Butyllithium, mhm[a] | 1.9 |
| Polymerization temperature, °C. | 56 → 107[e] |
| Polymerization time, minutes | 60 |
| Step V | |
| Methanol, mhm[a][c] | 3.8 |
| Reaction temperature, °C. | 107 |

[a] mhm = Gram millimoles per 100 grams of total monomers in that batch.
[b] Polymerization initiated at 55° C. and polymerization temperature peaked at 96° C.
[c] Added as a 2 weight percent solution in cyclohexane.
[d] Excess methanol terminator was flashed. Pressure was not dropped low enough to effectively flash cyclohexane diluent and thus little reactor cooling occurred as a result of venting. Reactor temperature was dropped to desired level prior to second batch polymerization initiation by circulating cool water through reactor jacket.
[e] Polymerization initiated at 56° C. and polymerization temperature peaked at 107° C.

Following Step V, 0.4 weight percent 2,6-di-t-butyl-4-methylphenol and 0.53 weight percent trisnonylphenyl phosphite (based on the total monomer charges of Batches 1 and 2) antioxidants in cyclohexane were added to the terminated polymer cement and the polymer recovered by steam stripping.

A sample of the polymer cement removed from the reactor following Step III of Batch 1 had a solids content of 15 weight percent, the typical value for a normal single batch polymerization of this specific polymer. This recovered polymer had a Mooney viscosity (ML-4 at 100° C.) of 39. A sample of the final, double batch polymer cement taken from the reactor following Step V of Batch II had a solids content of 23 weight percent, and the recovered polymer had a Mooney viscosity of 49. The gel permeation chromatography curve for the double-batch polymer was typical for the same polymer prepared by a normal single-batch procedure. The use of this double-batch procedure reduced by one half the quantity of cyclohexane diluent to be recovered and purified compared to two typical single-batch polymerizations, thus greatly reducing energy costs per unit weight of polymer produced.

This example demonstrates that polymer can be prepared in an energy saving double-batch process wherein terminated polymer cement from a first polymerization batch is retained in the reactor and used as the polymerization diluent for a second polymerization batch, and that the polymer so produced by this double-batch process is typical of polymer produced by a normal single-batch process.

EXAMPLE II

This example illustrates a process for producing butadiene/styrene linear random/block copolymer by an organolithium-initiated batch polymerization process using a terminated polymer cement recycle procedure in which following essentially quantitative conversion of a first charge of monomers to polymer and termination of the resulting living polymer, the terminated polymer cement is removed from the polymerization reactor, a minor portion of the polymer cement is subjected to polymer recovery steps, and the major portion of the terminated polymer cement is recycled to the polymerization reactor. A second charge of monomers and initiator and a small amount of cyclohexane diluent are then charged to the reactor, along with the recycled terminated polymer cement, and polymerized, the recycled terminated polymer cement from the first polymerization batch constituting the major portion of the polymerization diluent. Following essentially quantitative conversion of the second charge of monomers to polymer and subsequent termination of the thus produced living polymer, the resulting terminated polymer cement, which contains a mixture of the recycled portion of the terminated polymer prepared in polymerization Batch 1 and all of the terminated polymer prepared in polymerization Batch 2, is removed from the polymerization reactor, and partially recycled in the manner just described. Following termination of the third polymerization batch, all of the terminated polymer cement from the reactor is subjected to polymer recovery steps. The solids content, and consequently the polymer cement viscosity, of each succeeding batch in this process is higher than that of the previous batch.

The polymerization was conducted in the same reactor as described in Example I using a 6.80 kilograms (15 pounds) charge of total monomers for each of the three consecutive batch polymerizations. The same general operating conditions as described in Recipe 1 were used for this recycle process. Recipe 2 shows the quantities of ingredients used and the cement properties for each batch of the three batch recycle process.

| RECIPE 2 | | | |
|---|---|---|---|
| | Batch 1 | Batch 2 | Batch 3 |
| Ingredients | | | |
| Cyclohexane, parts by weight | 600 | 43 | 160 |
| Recycled terminated polymer cement from previous batch, parts by weight | 0 | 557 | 440 |
| 1,3-Butadiene, parts by weight | 75 | 75 | 75 |
| Styrene, parts by weight | 25 | 25 | 25 |
| Tetrahydrofuran, parts by weight | 0.05 | — | — |
| n-Butyllithium, mhm$^{(a)}$ | 1.9 | 2.0 | 2.7 |
| Methanol terminator, mhm$^{(a)}$ | 2.3 | 2.3 | 2.9 |
| Polymer Cement Properties | | | |
| Solids, weight percent | 14 | 25 | 30 |
| Cement viscosity, Pa·s | 0.125 | 2.8 | 5.3 |

$^{(a)}$mhm = Gram millimoles per 100 grams of total monomers in that batch.
$^{(b)}$Added as a 2 weight percent solution in cyclohexane.

Physical properties of the polymers prepared in Batches 1, 2, and 3 are shown in Table I (properties are for the polymer recovered from the portion of each batch which was not recycled).

TABLE I
Properties of Linear Random/Block Copolymers Prepared Using Recycle Process

| Property | Batch 1 | Batch 2 | Batch 3 |
|---|---|---|---|
| Molecular weight, $M_w^{(a)}$ | 77,000 | 81,000 | 81,000 |
| Molecular weight, $M_n^{(a)}$ | 72,000 | 74,000 | 75,000 |
| Heterogeneity index ($M_w/M_n$) | 1.07 | 1.09 | 1.08 |
| Inherent viscosity$^{(b)}$ | 0.86 | 0.96 | 0.91 |
| Gel, weight percent$^{(c)}$ | 0 | 0 | 0 |
| Styrene, weight percent$^{(d)}$ | 26.0 | 26.0 | 26.0 |
| Block styrene, weight percent$^{(e)}$ | 15.0 | 15.3 | 15.1 |
| Trans, percent$^{(f)}$ | 52 | 50 | 50 |
| Vinyl, percent$^{(f)}$ | 11.1 | 11.0 | 10.5 |
| Mooney viscosity, ML-4 at 100° C.$^{(g)}$ | | | |
| Raw | 53 | 63 | 62 |
| Compounded | 62 | 70 | 70 |
| 300% Modulus, MPa$^{(h)}$ | 11.6 | 11.0 | 10.7 |
| Tensile, MPa$^{(h)}$ | 17.4 | 18.5 | 17.9 |
| Elongation, percent$^{(h)}$ | 480 | 570 | 520 |
| Hardness, Shore A$^{(i)}$ | 81 | 81 | 81 |

$^{(a)}$Molecular weights were determined from gel permeation chromatography curves by a procedure described by G. Kraus and C. J. Stacy, J. Poly. Sci. A-2 10, 657 (1972), and G. Kraus and C. J. Stacy, J. Poly. Sci. Symposium No. 43, 329 (1973).
$^{(b)}$Inherent viscosity was determined according to the procedure given in U.S. Pat. No. 3,278,508, col. 20, Note a with the modification that the solution was not filtered through a sulfur absorption tube but rather a sample of the solution was filtered through a fritted glass filter stick of grade C porosity and pressured directly into the viscometer.
$^{(c)}$Gel determined according to procedure described in U.S. Pat. No. 3,278,508, col. 20, Note b.
$^{(d)}$Total styrene determined by ultraviolet absorption spectroscopy.
$^{(e)}$Determined using oxidative degradation procedure based in I. M. Kolthoff, T. S. Lee, and C. W. Carr, J. Poly. Sci. 1, 429 (1946).
$^{(f)}$Determined by infrared absorption spectroscopy. Represents the mole percent of total 1,3-butadiene charged which has this microstructure.
$^{(g)}$ASTM D1646-74.
$^{(h)}$ASTM D412-75.
$^{(i)}$ASTM D2240-68.

These data illustrate that butadiene/styrene linear random/block copolymers produced using recycled terminated polymer cement as polymerization diluent in three consecutive runs, and in which the solution viscosity was greater for each succeeding run, have essentially the same physical properties, and that 55 weight percent less cyclohexane diluent was required than would be needed in three typical individual batch polymerizations. This decrease in cyclohexane requirements substantially reduces the energy necessary to reclaim polymerization solvent, resulting in significant cost savings.

EXAMPLE III

This example illustrates a process for producing butadiene-styrene radial teleblock copolymer by an organolithium-initiated batch polymerization process using a terminated polymer cement recycle procedure in which following the formation of a first batch of radial teleblock copolymer, the terminated polymer cement is removed from the polymerization reactor, a minor portion of the polymer cement is subjected to polymer recovery steps, and the major portion of the terminated polymer cement is recycled to the polymerization reactor. A second batch of radial teleblock copolymer is then polymerized, the recycled terminated polymer cement from the first polymerization batch constituting the major portion of the polymerization diluent. Following termination of the second polymerization batch, all of the terminated polymer cement from the polymerization reactor is subjected to polymer recovery.

The polymerization was conducted in the same reactor used in Examples I and II. A 6.80 kilogram (15 pound) charge of total monomers was used for each batch. Recipe 3 shows the quantities of ingredients used and the cement properties for each batch of the recycle process.

| RECIPE 3 | | |
|---|---|---|
| | Batch 1 | Batch 2 |
| Step I | | |
| Cyclohexane, parts by weight | 600 | 43 |
| Recycled terminated polymer cement from Batch 1, parts by weight | 0 | 557 |
| Styrene, parts by weight | 40 | 40 |
| Tetrahydrofuran, parts by weight | 0.05 | 0.05 |
| n-Butyllithium, mehm[a] | 2.7 | 2.9 |
| Polymerization temperature, °C. | 57→68[b] | 57→69[b] |
| Polymerization time, minutes | 10 | 13 |
| Step II | | |
| 1,3-Butadiene, parts by weight | 60 | 60 |
| Polymerization temperature, °C. | 68→95[c] | 69→105[c] |
| Polymerization time, minutes | 10 | 12 |
| Step III | | |
| Silicon tetrachloride, mehm[a][c] | 2.7 | 2.7 |
| Reaction temperature, °C. | 95 | 105 |
| Reaction time, minutes | 10 | 10 |
| Polymer Cement Properties | | |
| Solids, weight percent | 14 | 24 |
| Cement viscosity, Ps | 0.11 | (d) |

[a]mehm = Gram milliequivalents per 100 grams of total monomers in that batch.
[b]First temperature represents initiation temperature and the second represents the peak temperature at which time the 1,3-butadiene in Step II is charged to the reactor.
[c]First temperature is the temperature of reaction mixture when 1,3-butadiene is charged, and the second is the peak temperature at which time the coupling agent in Step III is added to the reaction mixture.
[d]Not determined.

Physical properties of the polymers prepared in Batches 1 and 2 are shown in Table II (properties of polymer from Batch 1 are for the polymer from the portion of the cement not recycled).

TABLE II

| Properties of Butadiene-Styrene Radial Teleblock Copolymer Prepared Using Recycle Process | | |
|---|---|---|
| Property | Batch 1 | Batch 2 |
| Molecular weight, $M_w$[a] | 165,000 | 179,000 |
| Molecular weight, $M_n$[a] | 145,000 | 155,000 |
| Heterogeneity index, $M_w/M_n$ | 1.14 | 1.16 |
| Inherent viscosity[b] | 0.94 | 0.99 |
| Gel, weight percent[c] | 0 | 0 |
| Styrene, weight percent[d] | 39 | 40 |
| Block styrene, weight percent[e] | 34 | 34 |
| Trans, percent[f] | 52 | 51 |
| Vinyl, percent[f] | 13 | 12 |

[a]See footnote (a), Table I, Example II.
[b]See footnote (b), Table I, Example II.
[c]See footnote (c), Table I, Example II.
[d]See footnote (d), Table I, Example II.
[e]See footnote (e), Table I, Example II.
[f]See footnote (f), Table I, Example II.

These data illustrate that butadiene-styrene radial teleblock copolymers produced in two consecutive batches using recycled terminated polymer cement as polymerization diluent, and in which the solids content of the second batch is considerably higher than that of the first batch, have essentially the same physical properties, and that about 46 weight percent less cyclohexane diluent is required than would be needed for two typical individual batch polymerizations without recycle. This decrease in cyclohexane requirement substantially reduces the energy needed to reclaim the polymerization diluent, resulting in significant cost savings.

EXAMPLE IV

This example illustrates a process for preparing a highly concentrated solution of low molecular weight polybutadiene using multiple charges of monomer to a polymerization reaction mixture wherein polymer cement containing a low molecular weight polybutadiene terminated by chain transfer means (transmetalation agents) serves as diluent for polymerization of subsequent charges of monomer.

The polymerization was conducted according to Recipe 4 in a glass lined steel reactor having a capacity of about 2 liters.

| RECIPE 4 | |
|---|---|
| Step I | |
| Cyclohexane, parts by weight | 590 |
| Toluene, parts by weight | 400 |
| 1,3-Butadiene, parts by weight | 100 |
| Tetrahydrofuran, parts by weight | 10 |
| Potassium t-amyloxide, mhm[a] | 2.1 |
| n-Butyllithium, mhm[a] | 7.5 |
| Polymerization temperature, °C. | 40 |
| Polymerization time, minutes | 30 |
| Steps II through X | |
| 1,3-Butadiene, parts by weight | 100 |
| n-Butyllithium, mhm[a][b] | 0.5 |
| Polymerization temperature, °C. | 40 |
| Polymerization time, minutes | 30 |
| Step XI | |
| 2,6-Di-t-butyl-4-methylphenol, parts by weight[c] | 5 |

[a]mhm = Gram millimoles per 100 grams of 1,3-butadiene charged in that step.
[b]Added to compensate for initiator destroyed by impurities in feed.
[c]Added as a 1% by weight solution 50/50 by volume toluene/isopropanol.

The final polymerization solution after Step XI was 50 weight percent in solids and had a Brookfield viscosity of 1280 mPa.s. Samples of polymer recovered from the polymerization reaction mixture after Steps I and XI had properties as shown in Table III.

TABLE III

| Physical Properties of Polybutadiene Prepared Using Multiple Charge Technique | | |
|---|---|---|
| | Polymer Recovered Following | |
| | Step I | Step IX |
| Molecular weight, $M_w$[a] | 13,700 | 28,000 |
| Molecular weight, $M_n$[a] | 8,400 | 14,000 |
| Heterogeneity index, $(M_w/M_n)$ | 1.6 | 2.0 |
| Inherent viscosity[b] | 0.22 | 0.4 |
| Trans, percent[c] | (e) | 27 |
| Vinyl, percent[c] | (e) | 49 |
| Gel, weight percent[d] | 0 | 0 |

[a]See footnote (a), Table I, Example II.
[b]See footnote (b), Table I, Example II.
[c]See footnote (f), Table I, Example II.
[d]See footnote (c), Table I, Example II.
[e]Not determined.

These data illustrate that polymer cement containing polymer terminated by transmetalation reagents (toluene plus potassium tamyloxide) is an effective polymerization diluent for polymerization of subsequent charges of monomer, this process providing a means of obtaining a highly concentrated solution of polymer using a minimum amount of hydrocarbon polymerization diluent.

EXAMPLE V

This example illustrates a continuous polymerization process for preparing polybutadiene utilizing recycled terminated polymer cement as a portion of the polymerization diluent.

The polymerization was conducted in a reactor train consisting of an 820 cc capacity, jacketed, stirred, stainless steel reactor connected in series with a tube reactor having dimensions of about 1.27 cm diameter (0.5 inch) by about 7.62 cm long (3 inch) and having a capacity of about 10 cc. An inlet for introducing silicon tetrachloride located immediately after the tube reactor is followed by a Kenics static mixer having dimensions of about 1.9 cm (0.75 inch) diameter by about 15.2 cm (6 inches) long. Following the Kenics static mixer, the line is split into two streams, one stream of the terminated polymer cement being subjected to polymer recovery, and the remainder of the terminated polymer cement being recycled back to the stirred polymerization reactor. Two feed streams lead to the stirred polymerization reactor. Through one is introduced n-butyllithium diluted with n-hexane, and through the second is introduced 1,3-butadiene monomer and 1,2-butadiene gel inhibitor in n-hexane, in addition to the recycled terminated polymer cement which is reintroduced to the polymerization reactor through this line. Polybutadiene was prepared continuously at a solids content of about 25 weight percent according to Recipe 5.

| RECIPE 5 | |
| --- | --- |
| n-Hexane, parts by weight | 300[a] |
| 1,3-Butadiene, parts by weight | 100 |
| 1,2-Butadiene, parts by weight | 0.10 |
| Recycle cement, parts by weight | 267 |
| n-Butyllithium, mehm[b] | 1.4 |
| Silicon tetrachloride, mehm[b] | 1.8 |
| Polymerization pressure, KPa | 758 |
| Polymerization temperature, °C. | 120 |
| Polymerization time, minutes[c] | 15 |

[a]Of this total n-hexane, about 240 parts by weight was added with the 1,3-butadiene and 1,2-butadiene, about 50 parts was added with the n-butyllithium, and about 10 parts was added with the silicon tetrachloride.
[b]mehm = Gram milliequivalents per 100 grams of total monomer.
[c]Average residence time for reaction mixture in polymerization reactor means.

The conversion of monomer to polymer was 97.3 weight percent in the stirred polymerization reactor and 99.4 weight percent for the final product following termination. The solution viscosity of terminated polymer cement measured at 25° C. using a Brookfield viscometer (spindle number 4 and at 100 rpm) was 28 Pa.s. Physical properties of the polybutadiene prepared according to this process are shown in Table IV.

TABLE IV

Physical Properties of Polybutadiene Prepared By Continuous Polymerization Using Cement Recycle

| | |
| --- | --- |
| Molecular weight, $M_w$[a] | 316,000 |
| Molecular weight, $M_n$[a] | 127,000 |
| Heterogeneity index, $M_w/M_n$ | 2.5 |
| Inherent viscosity[b] | 2.07 |
| Vinyl, percent[c] | 11.9 |
| Mooney viscosity, ML-4 at 100° C.[d] | 46 |

TABLE IV-continued

Physical Properties of Polybutadiene Prepared By Continuous Polymerization Using Cement Recycle

| | |
| --- | --- |
| Gel, weight percent[e] | 0 |

[a]See footnote (a), Table I, Example II.
[b]See footnote (b), Table I, Example II.
[c]See footnote (f), Table I, Example II.
[d]See footnote (g), Table I, Example II.
[e]See footnote (c), Table I, Example II.

Preparation of this same polymer by a continuous process without cement recycle required the use of and the consequent recovery of 550 parts of n-hexane diluent per 100 parts of monomer to maintain the optimum polymerization temperature of 120° C. without external cooling means being applied to the polymerization reactor. The use of the recycle process of this example requires the removal and purification of only 55% (by weight) as much solvent as would be required without cement recycle, or alternatively does not require a cooling means for maintaining the polymerization reaction mixture at the optimum temperature of 120° C. in the event that a 25 weight percent solids polymerization was attempted without the use of recycled terminated polymer cement as diluent.

EXAMPLE VI

This example illustrates a continuous polymerization process for preparing a random 75/25 butadiene/styrene copolymer utilizing recycled terminated polymer cement as a portion of the polymerization diluent.

The polymerization was conducted in the same reactor train using the same general procedure as described in Example V with the modification that the feed stream containing monomers, 1,2-butadiene gel inhibitor, tetrahydrofuran randomizer, and the major portion of the polymerization diluent, prior to introduction into the stirred polymerization reactor, was first introduced into a 250 cc capacity, jacketed, stirred, stainless steel reactor and treated with sufficient n-butyllithium to inactivate any fast poisons, but at a n-butyllithium level which was insufficient to initiate polymerization. The random copolymer was prepared continuously at a solids content of about 20 weight percent according to Recipe 6.

| RECIPE 6 | |
| --- | --- |
| Cyclohexane, parts by weight | 400[a] |
| 1,3-Butadiene, parts by weight | 75 |
| Styrene, parts by weight | 25 |
| 1,2-Butadiene, parts by weight | 0.08 |
| Tetrahydrofuran, parts by weight | 1.0 |
| Multichelic initiator,[b] mehm[c] | 0.9 |
| Recycle cement, parts by weight | 270 |
| Silicon tetrachloride, mehm[c] | 1.2 |
| n-Butyllithium, mehm[c] (scavenger) | 0.17 |
| Polymerization pressure, KPa | 758 |
| Polymerization temperature, °C. | 120 |
| Polymerization time, minutes[d] | 15 |

[a]Of the total cyclohexane, about 350 parts by weight was added with the 1,3-butadiene, styrene, 1,2-butadiene, tetrahydrofuran, and n-butyllithium initiator, about 40 parts was added with the multichelic initiator, and about 10 parts was added with the silicon tetrachloride.
[b]Multichelic initiator prepared from the reaction of n-butyl-lithium with divinylbenzene in cyclohexane at a DVB/NBL molar ratio of 0.3/1.
[c]mehm = Gram milliequivalents per 100 grams of total monomers.
[d]Average residence time for reaction mixture in polymerization reactor means.

The conversion of monomer to polymer was 94.6 weight percent in the stirred polymerization reactor and 98.9 weight percent for the final product following termination. The solution viscosity of terminated polymer cement measured at 25° C. using a Brookfield viscometer (spindle number 4 and at 100 rpm) was about 108 Pa.s. Physical properties of the random 75/25 butadiene/styrene copolymer prepared according to this process are shown in Table V.

TABLE V

Physical Properties of Random 75/25 Butadiene/Styrene Prepared by Continuous Polymerization Using Cement Recycle

| | |
|---|---|
| Molecular weight, $M_w$[a] | 572,000 |
| Molecular weight, $M_n$[a] | 165,000 |
| Heterogeneity index, $M_w/M_n$ | 3.5 |
| Inherent viscosity[b] | 2.61 |
| Styrene, weight percent[c] | 25.6 |
| Block styrene, weight percent[d] | 0.6 |
| Vinyl, percent[e] | 23 |
| Mooney viscosity, ML-4 at 100° C.[f] | 115 |
| Gel, weight percent[g] | 0 |

[a]See footnote (a), Table I, Example II.
[b]See footnote (b), Table I, Example II.
[c]See footnote (d), Table I, Example II.
[d]See footnote (e), Table I, Example II.
[e]See footnote (f), Table I, Example II.
[f]See footnote (g), Table I, Example II.
[g]See footnote (c), Table I, Example II.

Preparation of this same random copolymer by a continuous process without cement recycle required the use of and the consequent recovery of 567 parts of cyclohexane diluent per 100 parts of total monomers to maintain the optimum polymerization temperature of 120° C. without the use of external cooling means for the polymerization reactor. The use of the process of this example requires the removal and purification of only 70% (by weight) as much solvent as would be necessary without cement recycle, or alternatively does not require a cooling means for maintaining the polymerization reaction mixture at the optimum temperature of 120° C. in the event that a 20 weight percent solids polymerization was attempted without the use of recycled terminated polymer cement as diluent.

EXAMPLE VII

This is a calculated example illustrating a process for preparing a butadiene-styrene linear random/block copolymer by organolithium initiated polymerization using a multiple, consecutive batch process in which flashing of a portion of the polymerization diluent from the polymerization reactor following essential quantitative conversion of monomer to polymer cools the reactor and its contents prior to termination and charging additional monomer, diluent and initiator for the following polymerization batch, and in which a portion of the terminated, concentrated, cooled polymer cement is retained in the polymerization reactor to be used as part of the polymerization diluent for the next polymerization batch, the remainder of the terminated, concentrated, cooled polymer cement being dumped from the polymerization reactor and subjected to polymer recovery steps. This process may be looked upon as a steady-state consecutive batch process, the first batch having one recipe and a lower percent solids and all following consecutive batches having another recipe and a higher percent solids. Sufficient consecutive batches can be polymerized until the desired quantity of polymer is produced.

Calculated Recipe 7 illustrates this process.

RECIPE 7

| | First Batch | Subsequent Batches |
|---|---|---|
| Step I | | |
| Hydrocarbon diluent, parts by weight | 600[a] | 460[b] |
| Retained concentrated, terminated polymer cement from previous batch, parts by weight | 0 | 140 |
| 1,3-Butadiene,[c] parts by weight | 75 | 75 |
| Styrene, parts by weight | 25 | 25 |
| Tetrahydrofuran, parts by weight | 0.05 | 0.04 |
| n-Butyllithium, mhm[d] | 1.7[e] | 1.6[e] |
| Polymerization temperature, °C.[f] | 44 → 115 | 44 → 115 |
| Polymerization time, minutes | 60 | 60 |
| Step II | | |
| Hydrocarbon diluent flashed off, parts by wt. | 160 | 160 |
| Reactor and reaction mixture temperature[g] | 115 → 56 | 115 → 56 |
| Step III | | |
| Methanol, mhm[d] | 1.5 | 1.5 |
| Reaction temperature, °C. | 56 | 56 |
| Reaction time, minutes | 5 | 5 |
| Step IV | | |
| Cement dumped to polymer recovery, parts by wt. | 400 | 400 |
| Percent solids of polymer cement | 18.5 | 25[h] |

[a]Consists of about 525 parts by weight commercial cyclohexane, and about 75 parts by weight of C$_4$ saturated hydrocarbon and monoolefins from the low concentration butadiene monomer feed stream. See footnote (c).
[b]Consists of about 385 parts by weight of commercial cyclohexane and about 75 parts by weight of C$_4$ saturated hydrocarbon and monoolefins from the low concentration butadine monomer feedstream. See footnote (c).
[c]Added as low concentration butadiene which contains about 50% 1,3-butadiene with the remaining portion being C$_4$ saturated hydrocarbons and monoolefins.
[d]mhm = Gram millimoles per 100 grams total monomers of a given batch.
[e]It was assumed that about 0.2 to about 0.3 mhm of the n-butyllithium which is charged is consumed by fast poisons in the feedstreams, the level of fast poisons being different for the first batch and subsequent batches due to different levels of hydrocarbon diluent employed and due to the presence of any excess recycled methanol terminator in the second and subsequent batches. It was desired to have about 1.4 mhm active initiator present in each batch.
[f]Polymerization initiated at 44° C. and polymerization temperature peaked at 115° C.
[g]The cooling of the reactor and its contents during the flash step will vary depending on the equipment used, and thus the temperature drop shown represents only a specific situation. Additional cooling or heating of the retained polymer cement and the feed streams to the polymerization reactor may be necessary to achieve the desired polymerization mixture initiation temperature.
[h]The second batch will have a solids content of 23.3 weight percent, and the succeeding batches will increase incrementally approaching 25 weight percent.

This calculated example illustrates the use of a flash step to partially cool the polymerization reactor and its contents prior to the next polymerization batch, and illustrates the retention in the polymerization reactor of a portion of the concentrated, terminated polymer cement from a previous batch polymerization for use as part of the polymerization diluent for a succeeding batch polymerization. The use of this process provides a cost savings by reducing the amount of solvent which must be recovered and purified, and flashing of hydrocarbon diluent from the polymerization mixture in the reactor reduces the energy requirement for cooling the reactor between separate batch polymerizations.

What is claimed is:

1. In the organolithium initiated solution polymerization of monomers comprising at least one polymerizable conjugated diene, and optionally at least one polymerizable monovinylarene hydrocarbon, the method of producing high levels of polymer solids without the requirement of cooling during polymerization comprising polymerizing the same said monomers in successive increments by contacting each incremental portion of said monomers with an organolithium initiator under solution polymerization conditions using hydrocarbon solvent, said hydrocarbon solvent consisting essentially of a hydrocarbon other than hexane if arenes are included in said monomers, until substantially all of the monomers in said portion have been polymerized, terminating the living polymer of each polymerization step with at least enough terminating agent to deactivate substantially all of the active polymer lithium, and employing at least a portion of the terminated polymer from the preceding polymerization step as at least a portion of the diluent for each succeeding polymerization step, wherein the amount of hydrocarbon solvent per quantity of monomer employed in each polymerization step is such that the weight percent polymer solids after that polymerization step is greater than the weight percent polymer solids produced in the preceding step and wherein the total amount of monomers and the reaction conditions are such that the weight percent polymer solids of conjugated diene polymer that is obtained is greater than the maximum weight percent solids of conjugated diene polymer having essentially the same physical properties that can be obtained by polymerizing all said monomers in one step without the use of cooling during polymerization.

2. In the organolithium initiated solution polymerization of monomers consisting essentially of dienes and excluding monovinylarene hydrocarbons, the method of producing high levels of polymer solids without the requirement of cooling during polymerization comprising polymerizing the same said monomers in successive increments by contacting each incremental portion of said monomers with an organolithium initiator under solution polymerization conditions until substantially all of the monomers in said portion have been polymerized, terminating the living polymer of each polymerization step with at least enough terminating agent to deactivate substantially all of the active polymer lithium, and employing at least a portion of the terminated polymer from the preceding polymerization step as at least a portion of the diluent for each succeeding polymerization step, wherein the amount of hydrocarbon solvent per quantity of monomer employed in each polymerization step is such that the weight percent polymer solids after that polymerization step is greater than the weight percent polymer solids produced in the preceding step and wherein the total amount of monomers and the reaction conditions are such that the weight percent polymer solids of conjugated diene polymer that is obtained is greater than the maximum weight percent solids of conjugated diene polymer having essentially the same physical properties that can be obtained by polymerizing all said monomers in one step without the use of cooling during polymerization.

3. A process according to claim 2 wherein a diene homopolymer is produced.

4. A process according to claim 3 wherein said homopolymer is a homopolymer of 1,3-butadiene.

5. A process according to claim 4 wherein said hydrocarbon solvent comprises n-hexane.

6. A process according to claim 4 wherein said hydrocarbon solvent comprises cyclohexane.

7. A process according to claim 4 wherein at least a portion of the hydrocarbon solvent is flashed off between two incremental polymerization steps.

8. A process according to claim 7 wherein said flashing is conducted after the polymerization of one incremental polymerization is complete and prior to the addition of the terminating agent in that incremental step.

9. A process according to claim 8 wherein 1-butene is present in the polymerization feed.

10. A method for producing a conjugated diene polymer using organolithium initiated solution polymerization using a hydrocarbon solvent consisting essentially of at least one hydrocarbon other than hexane which allows one to obtain a weight percent polymer solids higher than the maximum weight percent polymer solids of that quality polymer that can be obtained through a single essentially adiabatic organolithium initiated polymerization step in the same hydrocarbon solvent, said method comprising polymerizing monomers selected from the group consisting of polymerizable conjugated dienes and optionally polymerizable monovinylarene hydrocarbons in successive increments, each incremental polymerization involving (1) contacting the incremental portion of said monomers with an organolithium initiator under solution polymerization conditions until substantially all of the monomers in said portion have been polymerized, (2) terminating the resulting living polymer with enough terminating agent to deactivate substantially all of the active polymer lithium, and (3) employing at least a portion of the terminated polymer from a preceding incremental step as at least a portion of the diluent for each subsequent incremental polymerization step, wherein the total amount of hydrocarbon solvent and monomer and the reaction conditions are such that the weight percent polymer solids in the cement after the last polymerization step is greater than the maximum weight percent of polymer solids of conjugated diene polymer having essentially the same physical properties that can be obtained by polymerizing all said monomers in one essentially adiabatic polymerization step.

11. A process according to claim 10 wherein the weight percent polymer solids after each incremental polymerization step is greater than the weight percent polymer solids existing after the preceding step.

12. A process according to claim 10 wherein after at least one of the incremental polymerization steps flashing is used to remove at least a portion of the hydrocarbon solvent.

13. A process according to claim 12 wherein at least a portion of the hydrocarbon solvent is flashed off between two incremental polymerization steps.

14. A process according to claim 13 wherein said flashing is conducted after the polymerization of one incremental polymerization is complete and prior to the addition of the terminating agent in that incremental polymerization step.

15. A process according to claim 14 wherein the amount of monomer employed in each polymerization step is no greater than about 15 weight percent based on the total weight of the monomer and the diluent used in the respective polymerization step.

16. A process according to claim 15 wherein the monomers comprise 1,3-butadiene and optionally styrene.

17. A process according to claim 10 which is continuous wherein monomer, initiator, and terminator are continuously added to respective reaction zones and terminated polymer is continuously recovered.

18. A process according to claim 10 wherein the monomers comprise 1,3-butadiene and optionally styrene.

19. A method for producing a conjugated diene polymer using organolithium initiated solution polymerization in a hydrocarbon solvent to obtain a weight percent polymer solids higher than the maximum weight percent polymer solids of that quality polymer that can be obtained through a single essentially adiabatic organolithium initiated polymerization step in said same hydrocarbon solvent, said method comprising polymerizing monomers comprising at least one polymerizable conjugated diene and at least one polymerizable monovinylarene hydrocarbon in successive increments wherein the polymerization of diene precedes polymerization of the arene in each increment or the initiator is added to a mixture of the diene and the arene, each said incremental polymerization involving (1) contacting the incremental portion of said monomers with an organolithium initiator under solution polymerization conditions until substantially all of the monomers in said portion have been polymerized, (2) terminating the resulting living polymer with enough terminating agent to deactivate substantially all of the active polymer lithium, and (3) employing at least a portion of the terminated polymer from a preceding incremental step as at least a portion of the diluent for each subsequent incremental polymerization step, wherein the total amount of hydrocarbon solvent and monomer and the reaction conditions are such that the weight percent polymer solids in the cement after the last polymerization step is greater than the maximum weight percent of polymer solids of conjugated diene polymer having essentially the same physical properties that can be obtained by polymerizing all said monomers in one essentially adiabatic polymerization step.

20. A method according to claim 19 wherein the monomers comprise 1,3-butadiene and styrene.

21. A process according to claim 20 wherein the initiator in each increment is added to a mixture of the diene and arene.

22. A process according to claim 21 wherein the molar ratio of diene to arene is about 75/25.

23. A process according to claim 22 producing a linear random block copolymer.

24. A process according to claim 23 yielding at least 23 weight percent polymer solids after the last incremental polymerization.

25. A process according to claim 22 producing a branched random block copolymer.

26. A process according to claim 25 yielding at least 20 weight percent polymer solids after the last incremental polymerization.

27. A process according to claim 21 yielding at least 20 weight percent polymer solids after the last incremental polymerization.

28. A process according to claim 21 producing a branched random block copolymer.

29. A process according to claim 19 wherein 1-butene is present in the polymerization feed and wherein at least a portion of the hydrocarbon solvent is flashed off between two incremental polymerization steps.

30. A process according to claim 19 wherein diene is reacted with the initiator prior to contacting the arene with the initiator.

31. In the organolithium initiated solution polymerization of monomers consisting of dienes, the method of producing high levels of polymer solids without the requirement of cooling during polymerization comprising polymerizing the same said monomers in successive increments by contacting each incremental portion of said monomers with an organolithium initiator under solution polymerization conditions until substantially all of the monomers in said portion have been polymerized, terminating the living polymer of each polymerization step with at least enough terminating agent to deactivate substantially all of the active polymer lithium, and employing at least a portion of the terminated polymer from the preceding polymerization step as at least a portion of the diluent for each succeeding polymerization step, wherein the amount of hydrocarbon solvent per quantity of monomer employed in each polymerization step is such that the weight percent polymer solids after that polymerization step is greater than the weight percent polymer solids produced in the preceding step and wherein the total amount of monomers and the reaction conditions are such that the weight percent polymer solids of conjugated diene polymer that is obtained is greater than the maximum weight percent solids of conjugated diene polymer having essentially the same physical properties that can be obtained by polymerizing all said monomers in one step without the use of cooling during polymerization.

* * * * *